Aug. 7, 1951   W. ALBRAND   2,563,670
REGULATING APPARATUS FOR THE AUTOMATIC CHARGING IN
TWO STAGES OF A BATTERY OF ACCUMULATORS
Filed Oct. 3, 1946   4 Sheets-Sheet 1

INVENTOR
WLADIMIR ALBRAND
By Adams & Bush
ATTORNEYS

Fig: 3

Patented Aug. 7, 1951

2,563,670

UNITED STATES PATENT OFFICE 2,563,670

REGULATING APPARATUS FOR THE AUTOMATIC CHARGING IN TWO STAGES OF A BATTERY OF ACCUMULATORS

Wladimir Albrand, Paris, France, assignor to Compagnie Generale d'Electricite, Paris, France, a French corporation Application October 3, 1946, Serial No. 700,972
In France August 10, 1945

Section 1, Public Law 690, August 8, 1946
Patent expires August 10, 1965

7 Claims. (Cl. 320—23)

In the application of Georges Genin, Ser. No. 696,337, filed September 11, 1946, for "Method of Charging Storage Batteries," which has now become abandoned, a method has been described which consists of charging at constant current during a fixed time for a given state of discharge, followed by charging at a constant voltage, the voltage being selected in such manner that this second charge is capable of being continued as long as desired, without inconveniences.

In particular, the charging at constant current takes place advantageously at a value of current equal approximately to 0.17 C., C. being the capacity of the battery in ampere-hours for a 5 hour operation, while the charging at constant voltage is carried into effect at a voltage equal to that of the battery at the end of the charging at constant current.

The present invention has for its object to provide automatic apparatus supplied with power in any desired manner, as by a motor-generator set, a dry rectifier or a mercury vapour tube, and capable of charging storage batteries under the mentioned conditions, and equipped with a safety device for preventing the voltage from rising during the first stage over and beyond a certain safe value and for changing the constant current charge into a constant voltage charge as soon as this safe value is attained. This value, which depends upon the constructional characteristics and upon the type of the storage batteries, may be for example 2.55 volts per lead element.

An object of the present invention is to provide regulating apparatus for the automatic two-stage charging of a storage battery, one stage with constant current intensity Io during a time To determined by a given state of discharge, followed by a second stage having constant voltage Uo equal to that actually attained by the battery at the end of the first charging stage, and characterized in that it comprises a current regulator regulated to the value of current Io and a voltage regulator set for a value of voltage U'o which is greater than or equal to Uo. The value of Uo depends on the particular battery under charge and its condition. The selected value of voltage U'o for which the apparatus is set, is a value of voltage which may under the most favorable conditions be attained by the battery at the end of the first charging stage.

According to one first embodiment of this invention, the current regulator regulates the magnitude of the charging current simultaneously with the voltage regulator during the first stage, and has its action interrupted at the end of a time To by any desired device, the voltage regulator maintaining the charging voltage at the value Uo during the second charging stage, Uo being the voltage actually attained at the end of the first stage.

According to a second modification, the current regulator and the voltage regulator provide respectively and independently the regulation of the first and second stages.

This present invention will be better understood by reference to the following description and to the accompanying drawing which illustrates five embodiments of the present invention.

Figure 1:
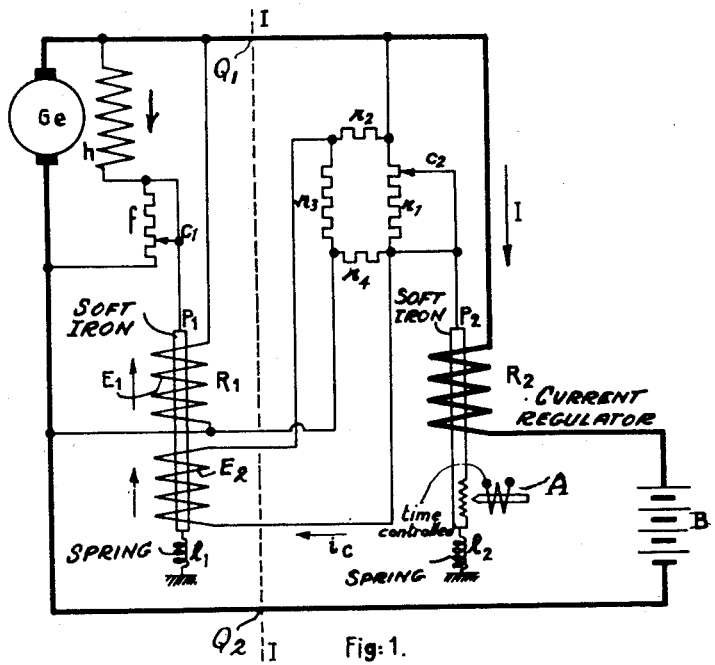
Fig. 1 is an arrangement of regulating apparatus according to the first embodiment of this invention, operated by a generator or motor-generator set and equipped with electro-magnetic voltage and current regulators.

As shown in Fig. 1, the regulating apparatus comprises:

An electromagnetic voltage regulator $R_1$ having two windings,

An electromagnetic current regulator $R_2$,

Four resistors $r_1$, $r_2$, $r_3$, and $r_4$, connected in bridge form, and

A device A for stopping the operation of the current regulator.

The electromagnetic voltage regulator $R_1$, which may be generally set for example to a value $U'o = 2.55$ v. per cell of the battery, comprises a soft iron core $p_1$ constantly urged back by a spring $l_1$, and which controls the displacement of a sliding contact upon the excitation rheostat of the generator.

Around this core $P_1$ there is a winding $E_1$ connected across the terminals of the charging generator G and which is therefore traversed by a current proportional to the voltage of this generator, and also a winding $E_2$ (termed "a compensation winding") connected across the terminals of a set of resistors forming a bridge.

The electromagnetic current regulator $R_2$, which may be set for a value of current $I_0 = 0.17$ C., amps. (C=capacity of the battery in ampere-hours), comprises a soft iron core $P_2$, the displacement of which may be blocked by the stopping device A. This core, likewise constantly urged back by a spring $L_2$ controls the displacement of a slide contact $C_2$ over one of the resistors $r_1$ of the bridge.

Around this core $P_2$ is placed a winding of heavy wire traversed by the charging current of the battery.

The resistors $r_1$, $r_2$, $r_3$ and $r_4$ are designed in such manner that for a certain position of the slide contact $C_2$ upon the resistor $r_1$, the bridge will be in balance, and consequently in such manner that no current will pass through the compensation winding $E_2$; for any other position of the slide, the winding $E_2$ will be traversed by a certain current.

The device for stopping the operation of the current regulator comprises a rod for blocking the displacement of the core $P_2$ of the regulator $R_2$, and the control of which is provided by means of an electromagnet. The latter is actuated by clockwork, by means of an ampere-hour meter, or by another analogous device.

The manner of operation of the above described regulating apparatus is as follows:

During the first charging stage at constant current, the voltage regulator $R_1$ tends to raise the voltage at the terminals of the generator G to 2.55 v. per cell. At this moment the magnitude of the charging current increases and exceeds the value 0.17 C. Thereupon the current regulator starts up and displaces the sliding contact $C_2$ upon the resistor $r_1$. Under these conditions, compensation winding $E_2$ is traversed by a compensation current $i_c$, and the ampere-turns generated by $E_2$ become added to those produced by $E_1$ in such manner that the displacement of the sliding contact $C_1$ upon the excitation rheostat $f$ of excitation winding $h$ of the generator G allows of obtaining a constant magnitude of the charging current during the whole of the period of the first stage.

If, during the first stage, the voltage at the terminals of the battery reaches 2.55 v., while the charging current is still 0.17 C. the bridge constituted by the resistors $r_1$, $r_2$, $r_3$, and $r_4$ is adjusted in such manner that the compensation current $i_c$ passing through the winding $E_2$ is cancelled out, and the voltage regulator $R_1$ thereafter maintains the voltage of the generator constant, this being equal to 2.55 v. per cell of the battery.

At the end of a determined time $T_o$ which depends upon the preceding state of discharge of the battery and whatever may be the voltage attained by the cells, whether lower than or equal to 2.55 v., the device for stopping the operation of the current regulator is actuated, and as from that instant it prevents any displacement of the core $p_2$ and consequently, of the sliding contact $C_2$ on bridge arm $r_1$.

The current traversing the winding $E_2$ becomes constant as from that moment, and the voltage regulator $R_1$ acts to maintain the voltage constant at the terminals of the generator G, and equal to the value attained at the end of the first stage, that is, $U_o$.

This voltage can in no case be greater than 2.55 per cell of the battery, since the voltage regulator by its construction is set to this value.

If the second stage of charging is carried out at the voltage $U'_o$, the value of $U'_o$ is such that the duration of the second stage can be indefinitely prolonged without damage to the battery.

The apparatus of Fig. 1 for charging by a motor-generator set may likewise be applied to charging by a dry rectifier or by a mercury vapor rectifier.

Figure 2:
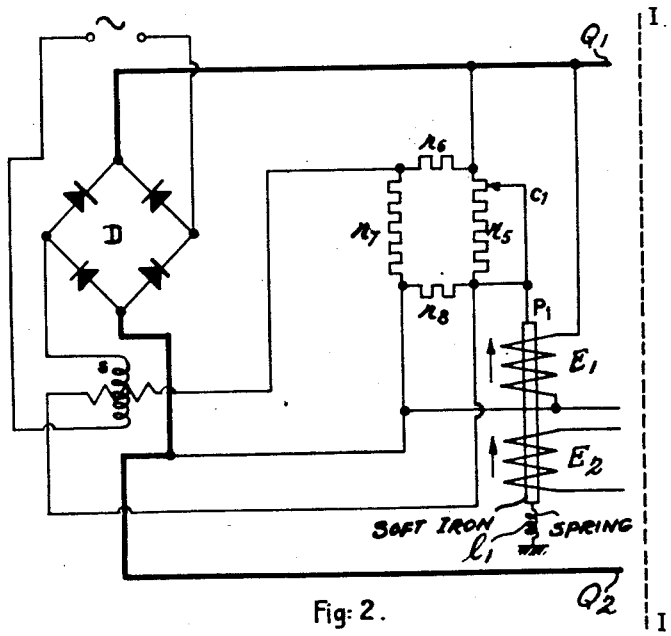
Fig. 2 is a modified view of the part of Fig. 1 to the left of the line I—I in the case in which the apparatus operates with a dry rectifier set.

For charging with a dry rectifier the portion of the regulator situated to the left of the broken line I—I in Fig. 1, will be replaced by a modified form shown in Fig. 2.

In this modification, the sliding contact $C_1$ acts upon a resistor $r_5$ forming part of a set of four resistors $r_5$, $r_6$, $r_7$ and $r_8$ connected in bridge form. The current tapped off between two corners of this bridge will then serve for the pre-magnetization of a self-inductance S connected in series with the rectifier D.

Figure 3:
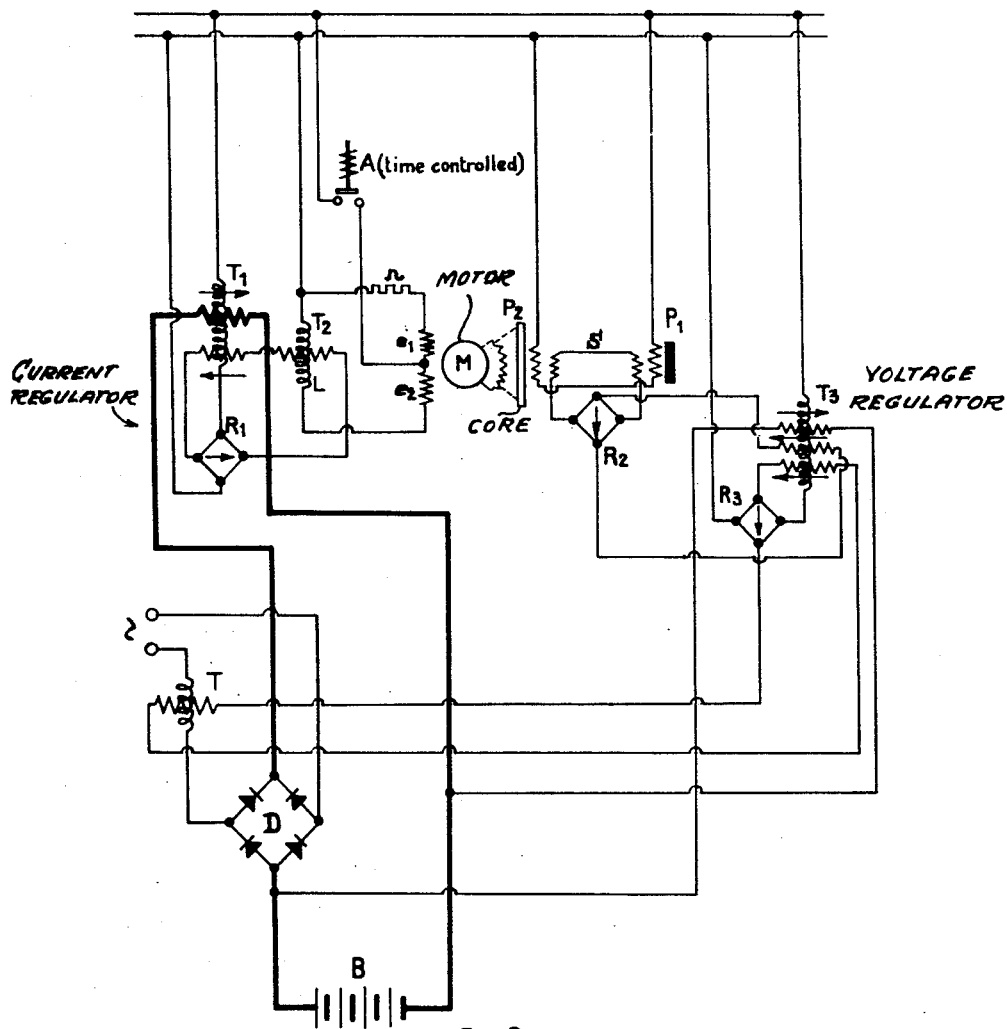
Fig. 3 shows another embodiment of the first modification of this invention, operating with a dry rectifier and equipped with regulating transductors.

Fig. 3 shows the circuit of another modification of the present invention for control of a dry rectifier and in the construction of which, transductors or saturable reactors have been employed as regulating devices. Such transductors may consist of a multiple leg transformer frame having alternating current and direct current windings on different legs, the direct current windings providing saturation of the core. Preferably, the alternating current winding is split and wound on the two outer legs, and the direct current winding or windings are wound on the middle leg. Such arrangements are known, and have been described, for instance, in Logan Patent 2,067,143, Hedding 2,399,185, Lamm Reissue 22,768, and Lang 2,426,937.

The apparatus comprises:

A main transductor T connected in series with the charging rectifier D of the battery B.

A transductor $T_1$ comprising two direct current windings and an alternating current winding connected in series with the rectifier $R_1$.

A transductor $T_2$ having one direct current winding and one alternating current winding L.

A transductor $T_3$ comprising three direct current windings and an alternating current winding connected in series with the rectifier $R_3$.

A rotary field motor M having two windings $e_1$ and $e_2$, connected in bridge form with the resistor $r$ and the alternating current winding L of the transductor $T_2$.

A step-up device S, and

A time controlled device A to stop operation of the motor M.

The transductor $T_3$ comprises a direct current winding connected across the terminals of the battery, a compensation winding fed by the rectifier $R_2$, and a self-exciting winding.

The three windings of transductor $T_3$ are so designed and connected that a slight deviation, for example from 2.55 v., per cell in one direction or in the other, brings about a substantial variation of the current in the saturation winding of the transductor T. In other words, the transductor $T_3$ and the rectifier $R_3$ constitute a voltage regulator.

The transductor $T_1$, which comprises a heavy wire winding (direct current) traversed by the battery-charging-current and a self-exciting winding, constitutes together with the rectifier $R_1$ a current regulator which may be set for example for 0.17 C.

The step-up device S comprises two transformers $P_1$ and $P_2$ with open magnetic circuits the primary windings of which are connected in series. The secondaries are likewise connected in series and in such manner that the electromotive forces induced in these windings, are in opposition.

The position of the core $P_1$ is fixed in relation to the windings of the transformers; but the core $P_2$ may be driven by the motor M in one direction or in the other, about the axis of the corresponding transformer. For a certain position of the core $P_2$ the two electromotive forces induced in the secondaries are cancelled out and the current delivered by the rectifier $R_2$ falls to zero. The motor M may rotate in one direction or in the other according as the impedance of the transductor $T_2$ is greater or less than that of the resistor $r$.

The device for stopping the operation of the current regulator is constituted by a time controlled relay A which cuts out the supply current of the motor M.

The transductors or saturable reactors $T_1$, $T_2$, $T_3$, as well as the step-up device, are supplied with alternating current with voltage stabilized by any known device.

The operation of the regulator apparatus just described, is as follows:

During the first charging stage with constant current, the voltage regulator $T_3$, $R_3$ tends to raise the voltage at the terminals of the battery, for example to 2.55 v. per cell. Assume at this instant the intensity of the charging current increases and exceeds the value of 0.17 C. The current regulator $T_1$, $R_1$ then enters into action and causes the impedance of the winding L of the transformer $T_2$ to vary. The balance of the bridge $e_1$, $e_2$, L and $r$, is disturbed, and the motor M starts up, carrying along with it the plunger $P_2$.

The compensation winding of transductor $T_3$ is therefore traversed by current, and the ampere turns generated by rectifier $R_2$ are added to those produced by rectifier $R_3$. Finally the output of rectifier $R_3$ falls, which brings about a reduction of the current passing through the direct current winding of transductor T. Consequently, its impedance increases. Thus during the whole period of the first stage, a constant current magnitude of the charging current is obtained. At the end of a time To which depends upon the previous state of discharge of the battery, the device A for stopping the motor M, is actuated, and the displacement of the core $P_2$ and consequently the action of the current regulator, are prevented. The current delivered by the rectifier $R_2$ becomes constant as from that moment, and the voltage regulator $T_3$, $R_3$ is put into operation to maintain the voltage at the terminals of the battery either constant or equal to the value attained at the end of the first stage.

This voltage cannot in any case be greater than 2.55 v. per cell since the voltage regulator by its construction, is set for this value.

According to the second modification of this invention, the replacement of the current regulator by the voltage regulator, at the end of the first charging stage, is carried into effect automatically by appropriate means such as a contact apparatus (a galvanometer or relay for example) and contactors, in which the contact apparatus operates at a voltage $U'o$ equal to or greater than $Uo$.

When $U'o$ is greater than $Uo$, the automatic closing of the contact apparatus is effected by means of resistors and of a servo-motor, which may be started up at the end of a time To by a metering or clockwork device or the like.

Figure 4:
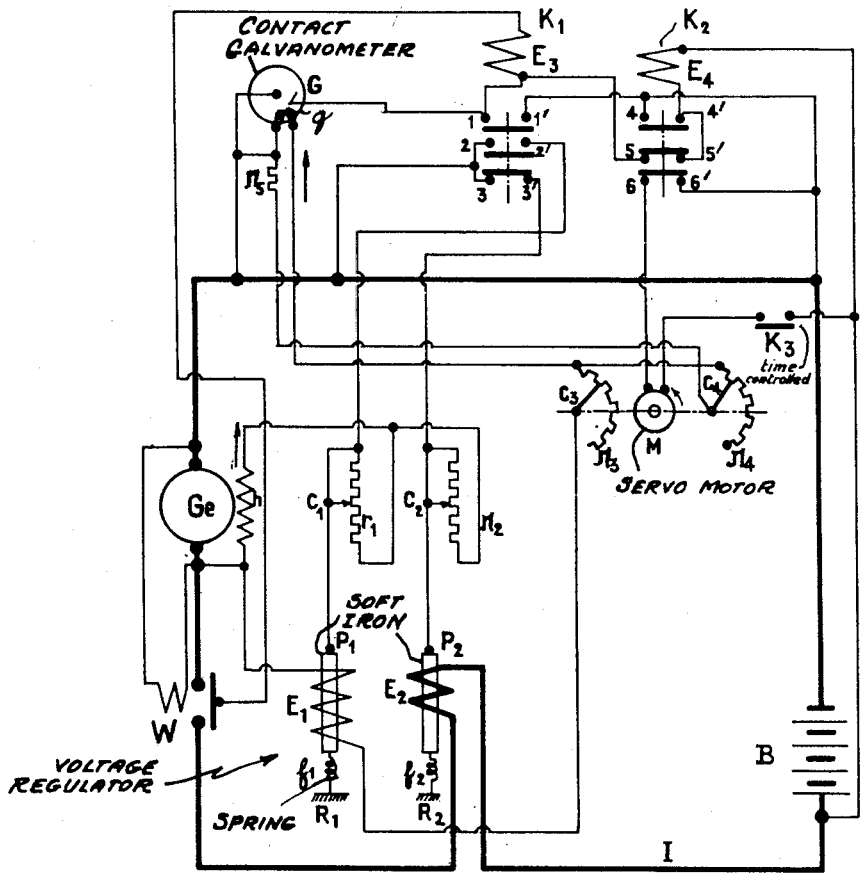
Fig. 4 is a circuit diagram of regulating apparatus according to the second modification of this invention operated by electromagnetic regulators and a motor-generator charging set.

The apparatus shown in Fig. 4 comprises an electromagnetic voltage regulator $R_1$, an electromagnetic current regulator $R_2$, a servo-motor M equipped with two sliding contacts mounted upon its shaft, a contact galvanometer G with two contactors $K_1$ and $K_2$, and a starter $K_3$ for the servo-motor M.

The voltage regulator $R_1$ which as previously described, is set for instance for a fixed value of 2.55 volts per cell of the lead battery is provided with an iron core $P_1$ constantly urged back into position by a spring $f_1$ which controls the displacement of the sliding contact $C_1$ in relation to the rheostat $r_1$ for the excitation of the generator Ge.

Around this core $P_1$ there is a winding $E_1$ connected in series with a resistor $r_3$, and the winding of the contact galvanometer. The whole is traversed by a current proportional to the voltage of the generator.

The current regulator $R_2$ which as previously described, is set for example for a value of the current $Io = 0.17$ C. ("C" being the capacity in ampere-hours of the battery to be re-charged) comprises a soft iron core $P_2$. This core is likewise constantly urged back into position by a spring $f_2$ and controls the displacement of the sliding contact $C_2$ on the rheostat $r_2$ in the circuit of the exciting winding $h$ for the excitation of the generator. Around this core there is a heavy wire winding traversed by the battery-charging current I.

The electromagnetic switch $K_1$ comprises a winding $E_3$ which is fed with current when the contact of the galvanometer G and the circuit-breaker W, are closed.

The function of the switch $K_1$ is to connect either the rheostat $r_2$ or the rheostat $r_1$ in such manner as to carry out the regulation of the field of the generator. For this purpose the switch $K_1$ is furnished with two pairs of contacts 2—2' and 3—3'. A third pair of contacts 1—1' serves for the additional energization of the winding $E_3$.

The contactor $K_2$ comprises a winding $E_4$ likewise fed with current when the contact of the galvanometer G is closed. The function of this contactor is to stop the servo-motor M by means of the contacts 6—6' when the closing of the contact of the galvanometer G is effected. The contacts 4—4' provide for additional energization of the winding $E_4$ and the contacts 5—5' prevent the operation of the relay $K_1$ when the armature of the contactor $K_2$ remains attracted upwardly, and the contact of the galvanometer G remains open. This might occur upon the re-establishment of the current after a breakdown in the current supply, which might happen during charging at constant voltage.

The galvanometer G (or any type of relay), is regulated in such manner that the contact is closed by a current of value corresponding to an average voltage of 2.55 volts per cell of the battery to be re-charged.

The starter device $K_3$ of the servo-motor M is actuated by clockwork mechanism, by a meter, or by any other analogous device.

The apparatus according to the present invention which has just been described, operates as follows:

During the first charging stage at constant current intensity, the winding of switch $K_1$ is not being supplied with current and the current regulator $R_2$ acts upon the excitation of the generator $G_e$ through the medium of the rheostat $r_2$, thus providing charging at constant current.

If during this charging at constant current the voltage at the terminals of the battery attains an average value $U_o$ of 2.55 volts per cell (in the case of a lead battery) while the current is still maintained at a value of 0.17 C., the contact of the galvanometer G closes and the windings of switches $K_1$ and $K_2$ are supplied with current. The operation of the switch $K_1$ brings about the substitution, in the excitation circuit for the rheostat $r_2$ of the rheostat $r_1$. As from that moment therefore, the regulator $r_1$ that is, the voltage regulator, comes into operation and maintains the voltage at the terminals of the generator, constant and equal to a value of 2.55 volts per cell.

If during the charging at constant current intensity the average voltage $U_o$ per cell never attains the value of 2.55 volts per cell, at the end of a time $T_o$ which depends solely upon the prior state of discharge of the battery, device $K_3$ actuates the servo-motor, which starts up, carrying along with it the sliding contacts $C_3$ and $C_4$. The current passing in the primary of the galvanometer increases, owing to the reduction of the resistance $r_3$ introduced into its circuit, and at the moment at which its value exceeds that which corresponds to a voltage $U_o'$ of 2.55 volts per cell, the contact of the galvanometer closes. The resistance $r_3$ is connected in series with the winding of galvanometer G and the windings of the voltage regulator. At this moment the switch $K_2$ stops the servo-motor, and the switch $K_1$ substitutes the rheostat $r_1$ for the rheostat $r_2$ in order to regulate the voltage at the terminals of the generator to a constant value which is equal to the value $U_o$ attained at the end of the first charging stage.

Figure 5:
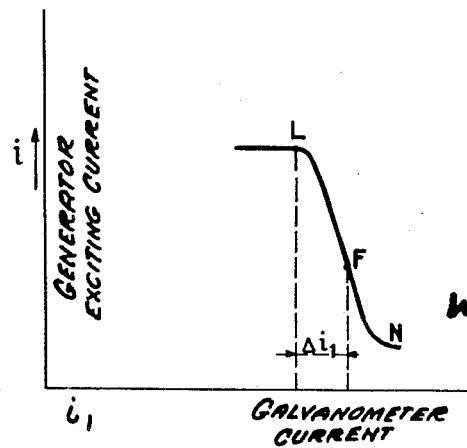
Fig. 5 is a curve showing the operation of the apparatus of Fig. 4.

The function of the resistance $r_4$ (Fig. 4) connected to the terminals of galvanometer G, is apparent from the curve of Fig. 5, which is the curve of the regulation of the voltage regulator $R_1$, here there have been plotted as abscissae the values of the current $i_1$ flowing in the primary of the contact galvanometer G, and there have been plotted as ordinates the values of the exciting current $i$ which excites the generator $G_e$.

The zone of operation of the voltage regulator is the part LN of the curve of Fig. 5; in fact, for a very small variation $\Delta i_1$ of the current $i_1$, there is obtained a large variation of the generator exciting current $i$.

In order to obtain a correct operation of the voltage regulator $R_1$, it is, therefore, necessary that at the instant when the change of the manner of operation should occur, the initial corresponding point of the operation of that voltage regulator shall lie on the part LN of the curve of Fig. 5.

The voltage regulator $R_1$ is always adjusted for a voltage $U_o$ (2.55 volts for a cell of a lead storage battery); when the voltage $U'_o$ has not been attained at the end of the time $T_o$ which is fixed in advance, it is necessary to modify the supply of the voltage regulator, there is then applied to the latter a voltage of value less than its operating voltage. It is the decrease of the resistance $r_4$ connected to the terminals of the galvanometer G which attains this condition.

Also, as to function of the resistor $r_4$ of Fig. 4 it may be explained by reference to Fig. 5 that the portion of the curve LN represents the zone of regulation of the curve $i = f(i_1)$, $i$ being the excitation current marked on the ordinates and $i_1$ the current which passes through the primary of the galvanometer G. The closing of the contact of the galvanometer G is set for a value of the current such that it corresponds to the point L of the curve.

If the excitation current of the generator immediately prior to the time $T_o$ is such that it may be represented by the assumed point F which is found upon the curve between the points L and N, it is necessary, before switches $K_1$ and $K_2$ will respond, to bring the point L back to F, by increasing slightly the current $i_1$ for which the closing of the contact of the galvanometer, takes place. This is accomplished by the resistor $r_4$ (Fig. 4) which is a shunt resistor, by means of the sliding contact $C_4$. As far as the resistor $r_5$ is concerned, this is merely an additional resistance.

Figure 6:
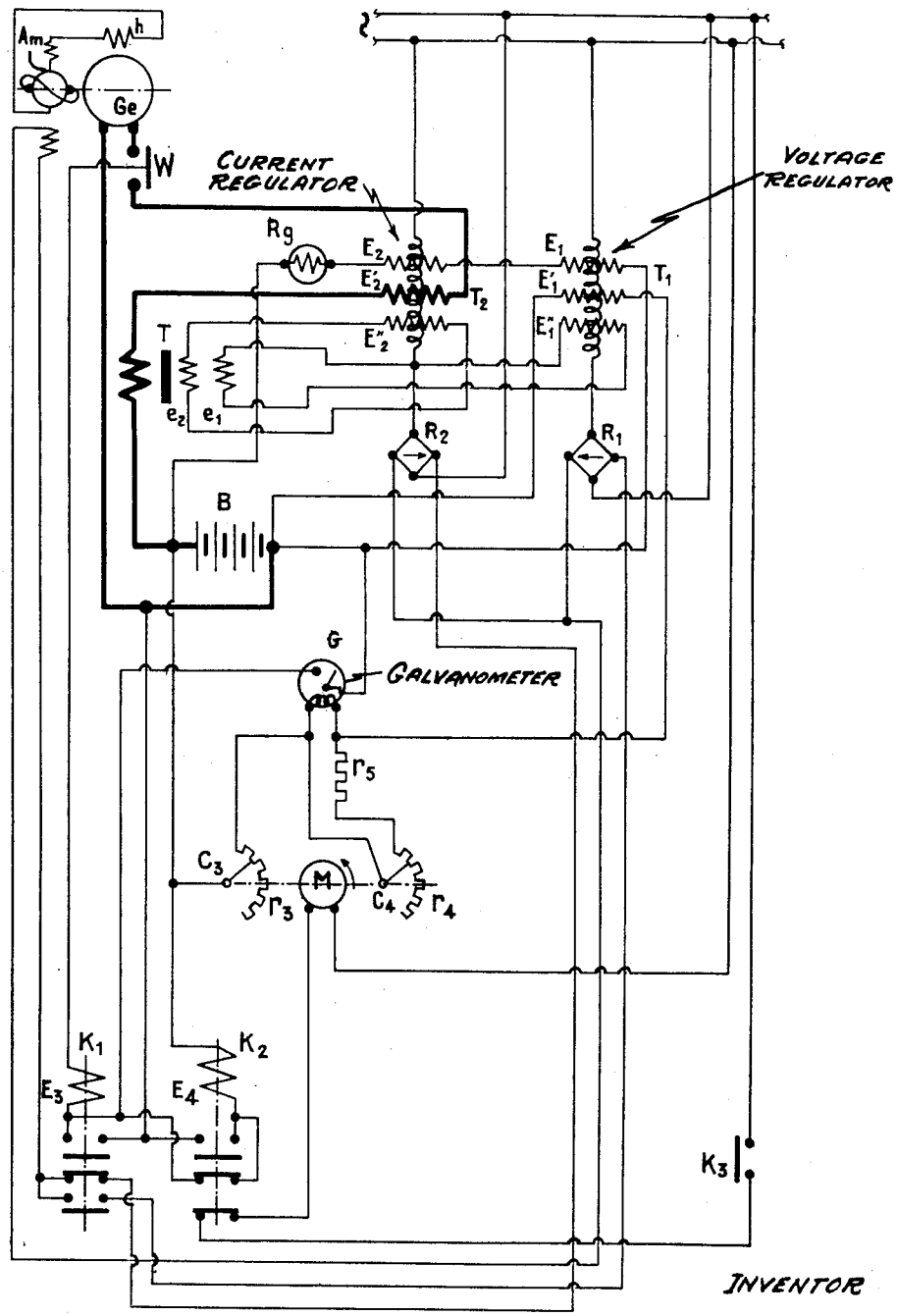
Fig. 6 is a circuit diagram of another form of regulating apparatus according to the second modification of this invention with a motor-generator charging set and employing transductors as regulators.

Fig. 6 shows the circuit of another embodiment of the present invention applicable to the control of a generator comprising an exciter at the end of the shaft, the latter being preferably of the amplidyne type. The amplidyne is a dynamoelectric amplifier consisting of an armature-excited generator having four brushes, of which two opposite brushes are short-circuited, as described by Alexanderson, General Electric Review, March 1940, Alexanderson Patent No. 2,227,992, and Thomas Patent No. 2,454,581.

In this modification, transductors are employed as regulating devices.

In this case the apparatus comprises:

A transductor $T_1$ comprising three direct current windings and an alternating current winding in series with the rectifier $R_1$, A transductor $T_2$ comprising three direct current windings and an alternating current winding in series with the rectifier $R_2$, A servo-motor M with two sliding contacts $C_3$ and $C_4$ placed upon its shaft, Two resistors $r_3$ and $r_4$, A contact galvanometer C, Two contactors $K_1$ and $K_2$, A starter device $K_3$ for the servo-motor M, A transformer T having two secondaries $e_1$ and $e_2$ the primary circuit of which is traversed by the charging current, and A regulating tube $R_g$ of constant current.

The transductor $T_1$ comprises a direct current winding $E_1$ traversed by a constant current tapped off at the terminals of the battery and regulated by the tube $R_g$.

The second direct current winding $E'_1$ is shunted across the terminals of this battery and is then traversed by a current proportional to its voltage.

Finally the third direct current winding $E''_1$ forms a closed circuit with the winding $e_1$ of the transformer T.

The unit $T_1 R_1$ constitutes a voltage regulator.

The transductor $T_2$ comprises a direct current winding $E_2$ in series with the winding $E_1$ and therefore traversed by constant current, the second winding (a direct current winding) $E'_2$ traversed by the charging current of the battery.

Finally its third direct current winding $E''_2$ forms a closed circuit with the winding $e_2$ of the transformer T.

The unit $T_2 R_2$ constitutes a current regulator.

The two windings $E''_1$ and $E''_2$ of the transductors $T_1$ and $T_2$ are not traversed (when in a steady condition) by any current, and consequently they have no part in the regulation of the transductors.

If there is a sudden variation in the charging condition, a current impulse is sent out by the transformer T to the windings $E''_1$ and $E''_2$; this impulse is such that it opposes the sudden variation of the control current in $E'_1$ and $E'_2$, thus obviating any risks of oscillation.

The servo-motor M with its two sliding contacts $C_3$ and $C_4$, the two resistors $r_3$ and $r_4$, the contact galvanometer G, the contactors $K_1$ and $K_2$ and the starter device $K_3$ of the servo-motor M, have exactly the same functions as those which they fulfilled in the apparatus shown in Fig. 4.

The starting up of the various devices is effected likewise in the same manner as for the device shown in Fig. 4, and the passage from one stage to another is effected by the substitution of the rectifier $R_1$ for the rectifier $R_2$ for the purpose of feeding the control winding of the amplidyne A with current.

It will be apparent to those skilled in the art that my invention is susceptible of modifications to adapt the same to particular conditions, and all such modifications which are within the scope of the appended claims, I consider to be comprehended within the spirit of my invention.

What I claim is:

1. Regulating apparatus for the automatic charging of a battery of accumulators comprising a current intensity regulator adapted to maintain a constant and predetermined intensity of charging current, a voltage regulator adapted to maintain a constant charging voltage and to operate simultaneously with said current intensity regulator, means for interrupting the action of said current intensity regulator at the end of a period related to the state of discharge of said battery, means for operating said voltage regulator to maintain a constant charging voltage equal to the voltage attained by said battery at the end of said period, and a balanced resistance bridge connection between said regulators.

2. Regulating apparatus for the automatic charging of a storage battery comprising a source of charging current, a current intensity regulator adapted to maintain a constant and predetermined intensity of charging current, a voltage regulator adapted to maintain a constant charging voltage and to operate simultaneously with said current intensity regulator, means for interrupting the action of said current intensity regulator at the end of a period related to the state of discharge of said battery, means for operating said voltage regulator to maintain a constant charging voltage equal to the voltage attained by said battery at the end of said period, said source comprising a charging rectifier, a main transductor connected in series with said charging rectifier, an auxiliary transductor having an alternating current winding, an auxiliary resistor, a step-up device, a motor having two windings and a rotary field, and a voltage regulating transductor and a current regulating transductor connected together by said step-up device and said motor in a bridge connection with said auxiliary resistor and the alternating current winding of said auxiliary transductor.

3. Regulating apparatus for the automatic charging of a storage battery comprising a source of charging current, a current intensity regulator adapted to maintain a constant and predetermined intensity of charging current, a voltage regulator adapted to maintain a constant charging voltage and to operate simultaneously with said current intensity regulator, means for interrupting the action of said current intensity regulator at the end of a period related to the state of discharge of said battery, means for operating said voltage regulator to maintain a constant charging voltage equal to the voltage attained by said battery at the end of said period, said source comprising a charging rectifier, a main transductor connected in series with said charging rectifier, an auxiliary transductor, having an alternating current winding, an auxiliary resistor, a step-up device, a motor having two windings and a rotary field, and a voltage regulating transductor and a current regulating transductor connected together by said step-up device and said motor in a bridge connection with said auxilary resistor and the alternating current winding of said auxiliary transductor, a regulating rectifier which supplies one of the windings of said voltage regulating transductor, said step-up device being constituted by two transformers having an open magnetic circuit, the primaries of said two transformers being connected in series and their secondaries being connected in opposition across said regulating rectifier, a first one of said transformers having a core which is fixed in position, and the second of said transformers having a core which is displaceable and is adapted to be driven by said motor.

4. In a regulating apparatus for the automatic charging of a storage battery, a battery to be charged, a source of charging current, a main charging circuit connecting said source to said battery, voltage control means for adjusting the voltage delivered by said source, a constant current regulator having a winding connected in series in said main charging circuit, and comprising means responsive to variations in the charging current for making compensating adjustments of said voltage control means, and maintaining a constant predetermined value of current in said charging circuit, constant voltage regulating means having an actuating winding connected across the terminals of said source and comprising means responsive to variations in the voltage of said source for making compensating adjustments of said voltage control means, and master control means comprising voltage limit responsive means connected across said source and adapted upon the attainment of a predetermined safe maximum limit of voltage of said source to render said constant current regulator ineffective, and to thereafter render said constant voltage regulating means effective for maintaining constant the voltage of said source at its value at the time of the rendering said constant current regulating means ineffective, said master control means further comprising time limit means adapted to render said constant current regulator ineffective and to thereafter render said constant voltage regulating means so effective if said predetermined safe maximum limit of voltage is not attained within a predetermined time.

5. Regulating apparatus according to claim 1, and a rectifier connected for supplying energy for charging the battery, an inductance having a D. C. saturating current winding and a principal winding, said principal winding being connected in series with said rectifier, and an auxiliary bridge of balanced resistances connected between said voltage regulator and said saturating current winding.

6. Regulating apparatus according to claim 4, said master control means comprising a voltage responsive relay which closes at the limiting safe magnitude of voltage and a contactor controlled by said relay, connections from said contactor for the substitution of said voltage regulating means for said current regulator, a variable resistor having a slidable rider contact connected in series with the winding of said voltage responsive relay and the winding of said voltage regulating means, a servo-motor for causing the displacement of the slidable contact of said variable resistor, a time-controlled starting contactor adapted for starting the servo-motor at the end of a predetermined time, and a stopping contactor for stopping the servo-motor and being controlled by the closing of said voltage responsive relay.

7. Regulating apparatus according to claim 4, said current regulator and said voltage regulating means each comprising an individual transductor and an individual rectifier, a transformer having its primary winding connected in said main charging circuit and having secondary windings, and each said transductor having a damping winding connected in closed circuit with a secondary winding of said transformer for damping oscillations in other windings of said transductors due to sudden variations of charging conditions.

WLADIMIR ALBRAND.

REFERENCES CITED

The following references are of record in the file of this patent:

UNITED STATES PATENTS

| Number | Name | Date |
|---|---|---|
| Re. 18,516 | Beetem | July 12, 1932 |
| Re. 22,768 | Lamm | June 25, 1946 |
| 1,008,243 | Creveling | Nov. 7, 1911 |
| 1,008,244 | Creveling | Nov. 7, 1911 |
| 1,008,294 | Creveling | Nov. 7, 1911 |
| 1,131,176 | Turbayne | Mar. 9, 1915 |
| 1,246,855 | Bliss | Nov. 20, 1917 |
| 1,264,021 | Crosby | Apr. 23, 1918 |
| 1,401,451 | Watson | Dec. 27, 1921 |
| 1,523,997 | Turbayne | Jan. 20, 1925 |
| 1,868,046 | Cole | July 19, 1932 |
| 1,923,709 | Coffee | Aug. 22, 1933 |
| 1,964,246 | Benit | June 26, 1934 |
| 2,067,143 | Logan | Jan. 5, 1937 |
| 2,102,141 | Wagar | Dec. 14, 1937 |
| 2,227,992 | Alexanderson et al. | Jan. 7, 1941 |
| 2,399,185 | Hedding | Apr. 30, 1946 |
| 2,426,937 | Lang | Sept. 2, 1947 |
| 2,431,312 | Cronvall | Nov. 25, 1947 |
| 2,454,581 | Thomas | Nov. 23, 1948 |

OTHER REFERENCES

Alexanderson, General Electric Review, March 1940.